United States Patent [19]

Kochhar et al.

[11] 4,021,599

[45] May 3, 1977

[54] OLEFIN POLYMERIZATION PROCESS AND CATALYST

[75] Inventors: Rajindar K. Kochhar, Katy; Robert J. Rowatt, Orange, both of Tex.

[73] Assignee: Gulf Research & Development Company, Pittsburgh, Pa.

[22] Filed: Jan. 9, 1976

[21] Appl. No.: 647,755

Related U.S. Application Data

[63] Continuation-in-part of Ser. No. 601,592, Aug. 4, 1975, abandoned, which is a continuation of Ser. No. 269,219, July 5, 1972, abandoned.

[52] U.S. Cl. .................... 526/124; 252/429 B; 252/429 C; 252/431 R; 252/431 C; 526/125; 526/348; 526/350; 526/352; 526/904
[51] Int. Cl.² .................... C08F 4/02; C08F 10/02
[58] Field of Search ........... 252/429 B, 429 C, 430, 252/431 R, 431 C; 526/124, 125

[56] References Cited

UNITED STATES PATENTS

| | | | |
|---|---|---|---|
| 2,981,725 | 4/1961 | Luft et al. | 526/125 |
| 3,300,457 | 1/1967 | Schmid et al. | 526/159 |
| 3,642,746 | 2/1972 | Kashiwa et al. | 526/125 |
| 3,644,318 | 2/1972 | Diedrich et al. | 526/124 |
| 3,676,414 | 7/1972 | Diedrich et al. | 526/124 |

FOREIGN PATENTS OR APPLICATIONS

| | | |
|---|---|---|
| 222,426 | 6/1959 | Australia |
| 2,014,330 | 4/1970 | France |
| 2,012,189 | 3/1970 | France |
| 2,137,872 | 2/1972 | Germany |
| 2,135,884 | 1/1972 | Germany |
| 1,958,488 | 5/1970 | Germany |
| 2,000,508 | 7/1971 | Germany |
| 838,028 | 6/1960 | United Kingdom |
| 1,140,649 | 1/1969 | United Kingdom |

OTHER PUBLICATIONS

Mitsui, Derwent Abstract 35807 T-A, May 31, 1972.

*Primary Examiner*—Edward J. Smith
*Attorney, Agent, or Firm*—Richard L. Kelly

[57] ABSTRACT

Ziegler-type catalysts of enhanced activity are produced by (1) suspending a finely divided polymeric support such as polyethylene in an alkanol solution of a magnesium compound such as magnesium chloride, (2) vaporizing the alkanol to deposit the magnesium compound on the support, (3) treating the magnesium compound impregnated support with a transition metal halide such as titanium tetrachloride in a hydrocarbon medium, and (4) reacting the product of (3) with an organometallic compound such as triethyl aluminum. The catalysts are particularly useful in polymerizing mono-1 olefins such as ethylene.

16 Claims, No Drawings

OLEFIN POLYMERIZATION PROCESS AND CATALYST

REFERENCE TO RELATED APPLICATIONS

This application is a continuation-in-part of our copending application, Ser. No. 601,592, filed on Aug. 4, 1975, now abandoned, which in turn is a continuation of our earlier application, Ser. No. 269,219, filed on July 5, 1972, now abandoned.

BACKGROUND OF THE INVENTION

It is known that Ziegler-type catalysts formed by combining an organometallic compound of the metal of Groups IIA, IIB and IIIA of the Periodic Table with a halide of a metal of Groups IVB, VB or VIB of the Periodic Table are useful for the polymerizing of mono-1 olefins at low pressures and low temperatures to form resinous polyolefins. (The Periodic Table referred to herein is published in Deming, General Chemistry (5th edition, Wiley, 1944), and is reprinted in Handbook of Chemistry and Physics, p. 336 (31st edition, Chem. Rubber, 1949).)

In preparing such catalysts, particularly suitable organometallic compounds are the alkyl, especially the lower alkyl compounds of the metals of Groups IIA, IIB and IIIA, such as aluminum, zinc, cadmium and beryllium. Organometallic compounds in which the metal is attached to cycloalkyl radicals of 3 to 7 carbon atoms or aromatic radicals such as phenyl, as well as halogenated compounds such as dialkyl aluminum chlorides are also suitable.

Some of the metal halides useful in preparing the aforementioned catalysts are the liquid or hydrocarbon soluble halides, particularly the chlorides and bromides, of titanium and vanadium, with the titanium and vanadium tetrachlorides and vanadium oxychloride being preferred. Other liquid or hydrocarbon soluble transition metal compounds suitable in preparation of Ziegler-type catalysts and in the practice of the invention as hereafter defined include chlorides, bromides, and alkoxides of titanium and vanadium, and mixed compounds which have the structure

where M is titanium, vanadium or vanadyl, and
X and Y are Cl, Br, or OR, and
m + n = valence of M
R is an alkyl containing up to 4 carbon atoms As specific examples of suitable organometallic compounds used in forming the aforementioned catalysts may be mentioned the dialkyl cadmiums such as diethylcadmium, dimethylcadmium and diisobutylcadmium, the dialkylzincs such as diethylzinc and dibutylzinc, the trialkylaluminums and dialkylaluminum hydrides such as diisobutylaluminum hydride, diethylaluminum hydride, trimethylaluminum, triethylaluminum, tripropylaluminum, triisobutylaluminum and diethylaluminum chloride, the cycloalkyl metal compounds such as tricyclohexylaluminum, and the aryl metal compounds such as diphenylcadmium and dinaphthylzinc. The alkyl group on such compounds is advisably a lower alkyl and particularly such a group having 1 to 4 carbons. It is also known that advantages can be obtained by using the catalysts in association with inert supports or carriers.

A variety of materials have been described in the prior art as effective carriers for the Ziegler catalysts to include a number of magnesium compounds. Among those magnesium compounds listed as carriers in the prior art are magnesium chloride. Although active catalysts are obtained by such magnesium chloride supported Ziegler catalysts in the polymerization of mono-1 olefins, the disadvantage of introducing significant levels of chloride into the polymer, and the variable hydration steps in which magnesium chloride can exist complicate the catalyst preparation procedure and can contribute to poor reproducibility. The disadvantage of employing highly hydrated magnesium compounds such as epsom salts as the catalyst support is that in treating the support excessive amounts of the transition metal compound are consumed by the support before the catalyst can be activated.

In U.S. Pat. No. 2,981,725 there is described a process wherein a water-soluble inorganic salt such as sodium carbonate, potassium carbonate, calcium chloride, sodium chloride, sodium sulfate or magnesium chloride is introduced as an additive to the polymerization mixture containing a transition metal halide, an organometallic compound and ethylene gas in a hydrocarbon solvent. The introduction of magnesium chloride as an additive into the polymerization system was not effective as the polymer yields were exceptionally low.

SUMMARY OF THE INVENTION

The present invention is concerned both with preparation of Ziegler-type catalysts of enhanced activity and methods for polymerizing mol-1 olefins therewith.

The catalysts of the invention consist of certain finely defined polymeric supports (subsequently described in greater detail) which are initially contacted with alkanol solutions of certain magnesium compounds. The alkanol then is vaporized to uniformly deposit a highly active form of the magnesium compound upon the surface of the polymeric carrier. The magnesium compound pregnated carrier then is reacted with a transition metal compound such as titanium tetrachloride to form a complex reaction product of the magnesium compound and the transition metal compound. This reaction product, which is supported on the polymeric carrier, then is reacted with an organometallic compound such as triethylaluminum to prepare the finished catalyst. The catalysts as thus prepared are extremely active and provide high yields of polymer per unit weight of catalyst when the catalysts are employed to polymerize mono-1 olefins such as ethylene and propylene.

DETAILED DESCRIPTION OF THE INVENTION

As earlier indicated, the catalysts of the invention are modified Ziegler-type catalysts in which the catalyst is carried on a particular type of polymeric support.

In the first step of the preparation of the catalysts, the catalyst support is suspended in an alkanol solution of a particular class of magnesium compounds. The polymeric carrier may be either an organic thermoplastic polymer or an organic thermoset polymer. The catalyst support should be in a finely divided particulate form which has at least 1 dimension not exceeding 600 microns and preferably having one dimension falling within the range of about 1 to 200 microns. The polymeric support may be of any desired shape such as spheres, rods or cylinders. Suitable polymeric materials include poly (triallyisocyanurate), polyethylene, poly-propylene, poly (3-methylbutene), poly (4-methylpentene), polyamides, polyesters, polyacrylamides, polyacrylonitriles, polycarbonates and cellulose. Essentially any polymer not soluble in an alkanol can be employed.

The alkanol solution of a magnesium compound employed in the treatment of the polymeric support in the first step of the catalyst preparation will be an alkanol solution of a magnesium compound having the structure:

$$MgX_2 \cdot nH_2O$$

where X is an anion which imparts solubility of at least 1% in a lower alkyl ($C_4$ or less) alcohol, and $n$ is not greater than 6. Thus, X can represent Cl, F, Br, I, $NO_3$, $OCH_3$, $OCOCH_3$, OCOH.

Magnesium compounds found to be particularly suitable in the practice of the invention include magnesium chloride, magnesium methoxide, magnesium nitrate, and magnesium acetate. The alkanol in which the magnesium compound will be dissolved will be an alcohol containing 1–4 carbon atoms such as methanol, isopropanol, butanol and the like. The alkanol solution should contain a relatively high concentration of the magnesium compound, e.g., desirably at least 10% by weight, by reason of the fact that the alkanol subsequently will be removed from the process by vaporization.

In carrying out the first step of the process the polymeric support will be suspended in a sufficient quantity of the alkanol solution of the magnesium compound so that the magnesium compound contained therein will constitute 1–60 weight % and preferably 5–25 weight % of the combined weight of the polymeric support and the magnesium compound. The polymeric carrier should be stirred with the alkanol solution of the magnesium compound to the extent required to thoroughly wet and impregnate the polymeric carrier with the alkanol solution.

In the second step of the catalyst preparation, the alkanol is vaporized from the suspension of the polymeric carrier in the alkanol solution so as to deposit the magnesium compound uniformly over the polymeric carrier. When the magnesium compound is deposited on the carrier in this manner it is in a highly active state particularly suitable for use in the preparation of the catalysts in the subsequent steps of the catalyst preparation.

The alkanol can be removed by simply distilling or evaporating the alkanol from the suspension of the polymeric carrier in the alkanol solution. When this technique is employed the distillation or evaporation is preferably carried out under reduced pressure. Frequently the distillation or evaporation of the alkanol will be accelerated by passing an inert sweep gas such as nitrogen or argon over the surface of the alkanol solution. Care should be exercised to remove the alkanol solution at moderate temperatures not exceeding 150° C. and preferably not exceeding 75° C. When a sweep gas is employed, special precautions should be employed to free the sweep gas of water, oxygen and other components recognized as having a deleterious effect upon Ziegler-type catalysts.

While a simple evaporation of distillation as described above may be used to remove the alkanol, somewhat better results are obtained if at least the final portions of the alkanol are removed by azeotropic distillation with an inert hydrocarbon. In this procedure, after a portion of the alkanol is removed as described previously, a liquid hydrocarbon such as heptane, benzene, toluene or the like will be added to the reaction vessel. The hydrocarbon then will be distilled from the system under atmospheric or preferably reduced pressure. So long as any free alkanol remains in the system, the distillate being removed from the system will be an azeotrope of the hydrocarbon and alkanol. When final traces of the alkanol are removed from the system, the vapor temperature of the distillate will rise to the boiling point of the hydrocarbon at the prevailing pressure employed in the distillation. Thus, the observed boiling point of the distillate serves as a criterion for determining when the removal of the alkanol is completed.

The hydrocarbon employed for removal of the alkanol may be any of the hydrocarbon types conveniently employed in the preparation of Ziegler-type catalysts. The hydrocarbon employed should be treated in a manner normally employed in the preparation of Ziegler-type catalysts so as to remove therefrom moisture and other material known to have a deleterious effect upon the activity of Ziegler-type catalysts.

In the next step of the catalyst preparation, the polymeric carrier wih the magnesium compound impregnated will be suspended in a liquid hydrocarbon of the type previously described. Normally, such a slurry will already have been prepared, particularly where the final traces of the alkanol are removed by azeotropic distillation as described immediately above. A transition metal compound then will be added to the hydrocarbon slurry to form a reaction product with the magnesium compound deposited on the polymeric support. The transition metal compounds which may be used for this purpose are identical with those conventionally employed in the preparation of Ziegler-type catalysts and as described earlier in this specification. The transition metal compound will be employed in the amount of 10–50% of the weight of the magnesium compound impregnated polymeric support. The transition metal compound is soluble in the hydrocarbon medium and will react with the magnesium compound at ambient temperature, although the reaction mixture can be heated to accelerate the reaction. In some circumstances, the reaction between the transition metal compound and the magnesium compound is completed in as little as two minutes, although the reaction mixture normally is permitted to stand for ten minutes to six hours or longer to assure complete reaction.

The magnesium compound – transition metal compound – support catalyst composition then is combined with an organometallic compound of the type previously described. The molar ratio between the organometallic compound and the transition metal compound can be varied within wide limits. A ratio of between 0.005 to about 2 mols of the transition metal compound, such as titanium tetrachloride, to one mole of the organometallic compound is suitable. Catalyst compositions containing titanium tetrachloride and triethyl aluminum have been found to be particularly effective in the polymerization of mono-1 olefins such as ethylene.

The catalysts prepared as described above have a number of features which make them particularly effective and desirable for use in the polymerization of mono-1 olefins. Initially, it will be noted that the magnesium compound, the transition metal compound and the organometallic compound are employed in the precise quantities required in the final catalyst composition. Thus, no expensive compounds are employed in excess of their actual need, and expenses of recycling and/or recovering excess starting materials are avoided. These factors, coupled with the high productivity rates of the catalysts, provides low production costs for the polymers produced. In addition, by reason of the high catalyst productivity rates, the finished polymers contain a low concentration of catalyst residues so that, for most purposes, they need not be removed from the polymers. Yet another advantage of the catalysts of the invention is that they have a specific gravity substantially the same as the hydrocarbon solvent employed in the olefin polymerization process. Thus, a uniform dispersion of the polymerization catalyst in the polymerization solvent is more easily obtained than is the case with more conventional Ziegler-type catalysts.

The magnesium compound — transition metal compound — organometallic compound — supported compositions of this invention can be employed in the polymerization of mono-1 olefins having from 2 to 8 carbon atoms per molecule. Although not to be limited thereto the novel catalyst is particularly effective in the polymerization of ethylene to produce polyethylene and in the copolymerization of ethylene with other mono-1 olefins containing from 3 to 8 carbon atoms.

The polymerization can be effected with such catalysts by contacting the mono-1 olefin with the catalysts in liquid or gaseous phase and in the presence or absence of an inert solvent such as benzene, xylene, or saturated hydrocarbons such as isooctane, n-hexane, n-heptane, pentane, decane and cyclohexane. The concentration of the catalyst composition in the polymerization zone is maintained in the range of 0.01 to 4.0 g. per liter of reactor volume. The polymerization reaction is generally conducted at a temperature of about 0° – 250° C. and at a pressure of about atmospheric or higher.

The polymerization process can be conducted batchwise or by continuous polymerization methods known in the art. The polymerization process employing the novel catalyst compositions can be conducted in the absence or presence of hydrogen and polymerization additives known in the art such as amines, ethers or dicumyl peroxide. The additives can be introduced onto the catalyst support prior to, during, or after treatment of the support with the transition metal compound. It is also within the scope of the invention to introduce the additive directly into the polymerization reactor.

The effluent mixture withdrawn from the polymerization mixture comprises a polymer slurry which can be filtered to isolate the resinous polyolefin. Other conventional polymer separation steps can be employed in the separation of the polymer product from the remainder of the polymerization reactor effluent.

If desired, although not normally required because of high productivity of the reaction, catalyst residues can be separated from the polymer product by methods known in the art. One method comprises stirring a slurry of the polymerized product in water or an alcohol such as methanol and then separating the resinous polyolefin by filtration to provide a white product. Polyolefins which are soluble in the reaction solvent can be precipitated from the solvent by adding an excess of methanol and filtering off precipitated polymer.

With the catalysts of the invention, a productivity of at least 10,000 g. of polymer per g. titanium per hour is normally obtained for olefin polymer products having molecular weights ranging from 20,000 to 2,000,000. These high productivities of the catalyst compositions eliminate the necessity in most instances for separating the very small catalyst residues remaining in the polymer product.

The following examples are presented to illustrate the practice of the invention. It is not intended, however, to limit the invention to the specific embodiments presented therein.

EXAMPLE 1

This example utilizes polyethylene as a catalyst support material. 300 grams of particulate polyethylene was slurried in 450 ml of methanol containing 33.75 grams of dissolved anhydrous magnesium chloride under a dry atmosphere. Excess methanol was removed under vacuum at 40° – 50° C. The recovered solids were then placed in a dry box and the material passing through a 32 mesh screen was collected.

0.2 gram of this magnesium compound-treated support and 0.056 gram titanium tetrachloride were charged into a catalyst bottle containing 100 ml of dry hexane. This mixture was stirred for 10 minutes.

The contents of the catalyst bottle were charged into a 1.5 liter polymerization reactor containing 900 ml n-heptane. 2.0 ml of a 25 weight percent solution of triethyl aluminum in hexane was also introduced into the reactor. The reactor was heated to 75° C. and dry ethylene gas introduced into the reactor at 40 psig. After a polymerization run of 0.5 hour, 286 grams of fine granular polyethylene was recovered from the reactor. This corresponded to a productivity of 40,800 grams of polyethylene per gram of titanium per hour.

EXAMPLES 2–4

A series of polymerizations of ethylene were run with the catalyst of Example 1. The polymerizations were run for 30 minutes in a 5 gallon stirred autoclave in the presence of the quantity of catalyst prepared from 1.0 gram of the magnesium compound treated support. The polymerization temperature employed was 90° C. The ethylene pressure employed was 80 psig and the ethylene contained varying percentages of hydrogen. The polymer yield and bulk density of the polymer in each run is also shown below in Table I.

TABLE I

| Example No. | Reaction Temp., ° C. | $H_2$ Conc. Wt.% of Ethylene | Polymer Data Yield Grams | Bulk Density g/ml |
|---|---|---|---|---|
| 2 | 90 | 3.6 | 1396 | 0.24 |
| 3 | 90 | 7.2 | 1320 | 0.30 |
| 4 | 90 | 14.4 | 898 | 0.34 |

EXAMPLE 5

The catalyst composition of this example and succeeding Examples 6, 7 and 8 was prepared by treating 300 grams of polyethylene with 450 ml of a methanolic solution containing 33.75 grams of magnesium chloride. The slurry was well mixed and the methanol removed by vacuum at 40° C. to obtain an activated carrier consisting of 10 weight percent magnesium chloride adsorbed on polyethylene.

An activated catalyst composition was prepared by treating 0.2 gram of the activated carrier which had been weighed into a 200 ml Fisher Porter catalyst bottle under an inert atmosphere with 0.56 ml of a hexane solution containing 0.1 gram of titanium tetrachloride per ml. Sufficient hexane was added to the catalyst bottle to bring the total volume to about 50 ml. After an aging period of 5 to 15 minutes, 2 ml of a 25 weight percent solution of triethyl aluminum in hexane was added.

The catalyst composition was then transferred into a 1.5 liter Chemco reactor and the reactor charged with 1,000 ml of heptane. The ethylene to be fed to the reactor was contained in a hold tank at an initial pressure of 150 psig. Ethylene was fed to the reactor through a valve to maintain a constant pressure of 40 psig in the reactor. The reactor also was fitted with means to feed aliquots of a solution of butene-1 in heptane (18 weight % butene-1) to the reactor.

The reactor then was charged with ethylene to a pressure of 40 psig and then was heated to 75° C. As soon as polymerization was initiated, approximately 10 ml of the butene-1 solution was transferred to the reactor. When the pressure in the ethylene hold tank fell to, respectively, 90 psig and 50 psig, additional aliquots of approximately 20 ml of the butene-1 solution were transferred to the reactor. A total of about 9 grams of butene-1 was introduced into the reactor. When the pressure in the ethylene hold tank fell to 40 psig, the polymerization was terminated.

162.9 grams of an ethylene-butene copolymer product containing 5.6 weight percent butene was produced during the polymerization run. The polymer was found to contain 2.83 methyl groups per 1,000 carbon atoms and has a polymer density of 0.9469.

EXAMPLE 6

The run of Example 5 was repeated with the exception that 7.15 grams of 1-hexene in 80 ml heptane was added in 3 aliquots to the reactor. 238 grams of an ethylene-hexene copolymer was obtained containing 3.0 weight percent 1 — hexene. The copolymer has less than 2 methyl groups per 1,000 carbon atoms and a polymer density of 0.9454.

EXAMPLE 7

In this example the novel catalyst composition is employed in the preparation of an ethylene-propylene copolymer. Ethylene at a partial pressure of 264 psig was mixed with propylene at a partial pressure of 5.4 psig in a holding tank. The mixture was charged continuously to a reactor containing 0.2 gram of the activated carrier of Example 5, 0.056 gram titanium tetrachloride, 2.0 ml of a 25 weight percent solution of triethyl aluminum in hexane and 1 liter n-heptane. The polymerization was conducted with agitation at 75° C. with a continuous supply of the mixed gases being introduced into the reactor. The rate of reaction was determined by observing the pressure drop in the holding tank.

After one hour the reaction was stopped by venting the gases. On filtration and drying, the reaction mixture produced 170 grams of a polymer. The polymer, on infrared analysis, was found to contain 11.5 methyl groups per 1,000 carbon atoms and had a polymer density of 0.9531. This analysis indicates the production of an ethylene-propylene copolymer containing 2.0 weight percent propylene.

EXAMPLE 8

The run of Example 7 was repeated with the exception that the holding tank was charged with ethylene under a partial pressure of 237.5 psig and propylene under a partial pressure of 12.5 psig. At the end of a one hour polymerization run 140 grams of a polymer containing 85 methyl group per 1,000 carbon atoms and having a density of 0.9176 was obtained. This corresponds to an ethylenepropylene copolymer containing 5.0 weight percent propylene.

EXAMPLE 9

A glass flask equipped with a charging port and a distillation take off head was charged with 30 grams of powdered polyethylene and 4 grams of magnesium chloride dissolved in 45 ml of methanol. The mixture was stirred for 5 minutes and then approximately 25 ml of methanol was removed by vacuum distillation. Two liters of hexane was added to the reactor and a hexane-methanol azeotrope was removed by atmospheric distillation until the boiling point of the distillate rose to the boiling point of methanol. Twenty grams of TiCl4 dissolved in 200 ml of hexane then was added to the flask. The reaction mixture was stirred for 2 hours at ambient temperature. Seventy grams of a 25% solution of triethyl aluminum in hexane then was added to the reactor to prepare the finished catalyst.

The catalyst as prepared above, when used to polymerize ethylene, gives rates of polymerization comparable to those shown in Examples 1–4.

Although the invention has been described with reference to specific materials, embodiments and details, various modifications and changes, within the scope of this invention will be aparent to one skilled in the art and are contemplated to be embraced in the invention.

We claim:
1. A process for preparing an olefin polymerization catalyst which consists essentially of the sequential steps of:
   1. Intimately contacting a finely divided, alcohol-insoluble, heptane-insoluble, transition metal halide-insoluble support material with a 1-4 carbon atom alkanol solution of a magnesium compound,
   2. Vaporizing the alkanol from the suspension of Step (1) to deposit the magnesium compound on the surface of the finely divided support material,
   3. Suspending the product of Step (2) and a transition metal halide in a liquid hydrocarbon for a period of at least 2 minutes, and
   4. Adding an organometallic compound of a metal of Groups II-a, II-b and III-a of the Periodic Table to the suspension of Step (3);

the finely divided support material employed in Step (1) having at least one dimension not exceeding 600 microns and being selected from the group consisting of organic thermoplastic polymers and organic thermoset polymers; the magnesium compound employed in Step (1) having the structure:

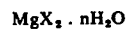

where X is Cl, F, Br, I, $NO_3$, $OCH_3$, $OCOCH_3$, or $OCOH$, and $n$ is not greater than 6, the magnesium compound employed in Step (1) constituting 5–25 weight % of the combined weight of the finely divided support and the magnesium compound; the transition metal halide employed in Step (3) being selected from the group consisting of the liquid or hydrocarbon soluble halides of titanium and vanadium, the alkoxides of titanium and vanadium and mixed transition metal halide compounds having the structure:

$$MX_nY_m$$

where M is titanium, vanadium or vanadyl, where Y and X are Cl, Br, or OR, where $m + n =$ the valence of M, and R is an alkyl group containing up to 4 carbon atoms; the transition metal halide employed in Step (3) being employed in the amount of 10% to 50% of the weight of the supported magnesium compound employed in Step (3); and the organometallic compound employed in Step (4) being employed in an amount sufficient to provide a ratio of from 0.005 to 2 mols of transition metal halide per mol of organometallic compound.

2. The process of claim 1 in which the alkanol is vaporized in Step (2) by being distilled directly from the suspension.

3. The process of claim 1 in which a hydrocarbon is added to the suspension formed in Step (1) and the alkanol is vaporized in Step (2) by being distilled from the suspension as an azeotrope with the hydrocarbon.

4. The process of claim 1 wherein said magnesium compound is selected from the group consisting of magnesium chloride, magnesium methoxide, magnesium acetate and magnesium nitrate.

5. The process of claim 1 wherein said support is an organic thermoplastic polymer.

6. An olefin polymerization catalyst prepared by the method of claim 1.

7. An olefin polymerization catalyst prepared by the method of claim 2.

8. An olefin polymerization catalyst prepared by the method of claim 3.

9. An olefin polymerization catalyst prepared by the method of claim 4.

10. An olefin polymerization catalyst prepared by the method of claim 5.

11. A process for polymerizing a mono-1 olefin which consists essentially of contacting a mono-1 olefin with a catalyst prepared by the method of claim 1.

12. A process for polymerizing a mono-1 olefin which consists essentially of contacting a mono-1 olefin with a catalyst prepared by the method of claim 4.

13. A process for polymerizing a mono-1 olefin which consists essentially of contacting a mono-1 olefin with a catalyst prepared by the method of claim 5.

14. The process of claim 11 wherein said mono-1 olefin is selected from the group consisting of ethylene, propylene, butene-1 and hexane-1, said organometallic compound is triethyl aluminum and said transition metal compound is titanium tetrachloride.

15. The process of claim 11 wherein the polymerization temperature is in the range of 0° to 250° C. and the polymerization pressure is at least about atmospheric.

16. The process of claim 11 wherein the concentration of the activated support-containing catalyst composition is maintained in the range of 0.01 to 4.0 grams per liter of the reactor volume.

* * * * *